United States Patent [19]

Rossigno

[11] Patent Number: 5,233,911
[45] Date of Patent: Aug. 10, 1993

[54] TANDEM BRAKE BOOSTER

[75] Inventor: Louis P. Rossigno, Granger, Ind.

[73] Assignee: Allied-Signal Inc., Morristown, N.J.

[21] Appl. No.: 843,678

[22] Filed: Feb. 28, 1992

[51] Int. Cl.⁵ ............................................. F15B 11/00
[52] U.S. Cl. ................... 91/508; 91/376 R; 91/533; 92/128
[58] Field of Search ............... 91/369.1, 369.2, 369.3, 91/369.4, 533, 376 R, 508; 92/48, 128

[56] References Cited

U.S. PATENT DOCUMENTS

| | | | |
|---|---|---|---|
| 3,289,547 | 12/1966 | Kytta | 91/369.2 X |
| 3,517,588 | 6/1970 | Kytta | 91/369.2 |
| 3,813,992 | 6/1974 | Brown | 91/369.4 X |
| 4,409,885 | 10/1983 | Reinhartz et al. | 91/376 R |
| 4,953,446 | 9/1990 | Fecher et al. | 91/369.3 |
| 4,970,939 | 11/1990 | Fecher et al. | 91/376 R X |
| 5,076,142 | 12/1991 | Steer et al. | 91/369.3 |
| 5,161,453 | 11/1992 | Yared et al. | 91/376 R |

Primary Examiner—Edward K. Look
Assistant Examiner—Todd Mattingly
Attorney, Agent, or Firm—Leo H. McCormick, Jr.; Ken C. Decker

[57] ABSTRACT

A method of manufacturing a tandem brake booster wherein a rearwall is derived from the separation plate of a single brake booster. The separation plate is modified by creating a passageway therethrough and using splines on the hub which are mated with keyways in a cylindrical body that extends from a front movable wall to assure that passages between the resulting front and rear chambers are aligned. A return spring holds a seal between the cylindrical body and hub to assure cross communication does not occur between the passageways. Thereafter, any operational pressure differential created during a brake application is directed into the development of an output force to effect a brake application.

7 Claims, 5 Drawing Sheets

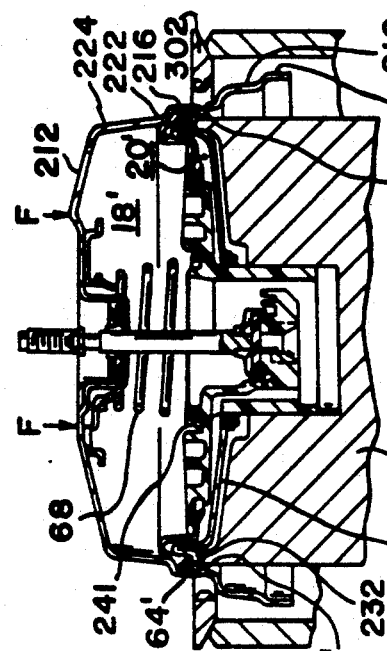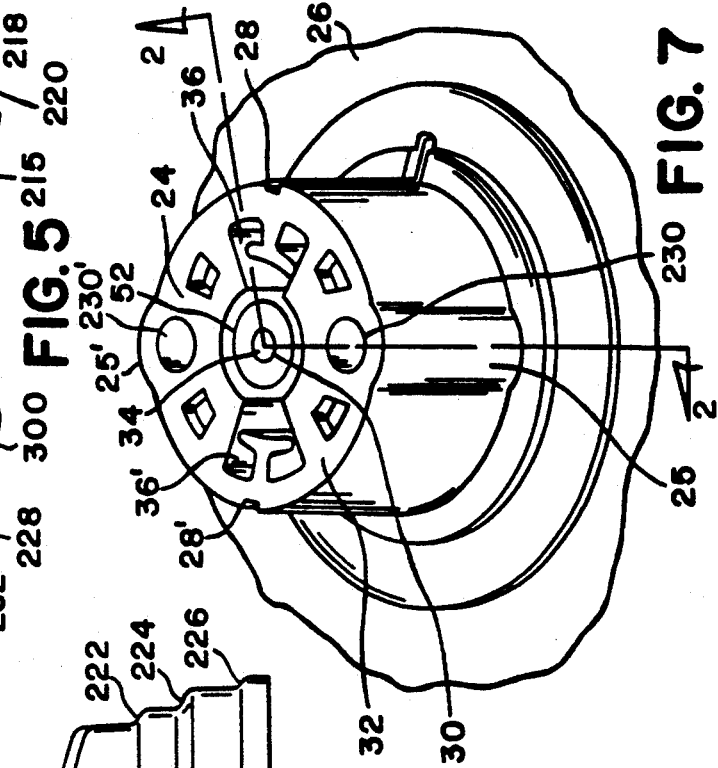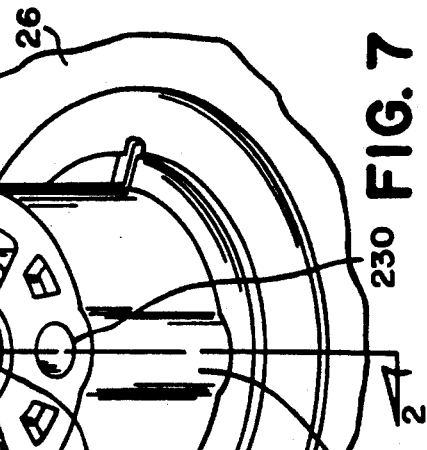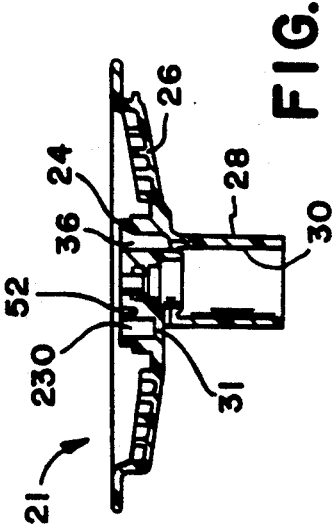

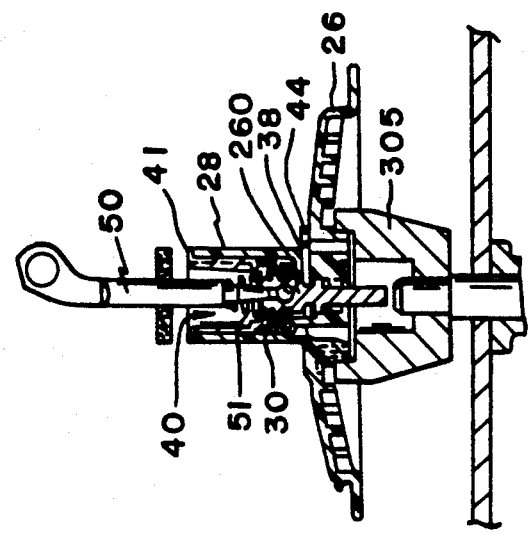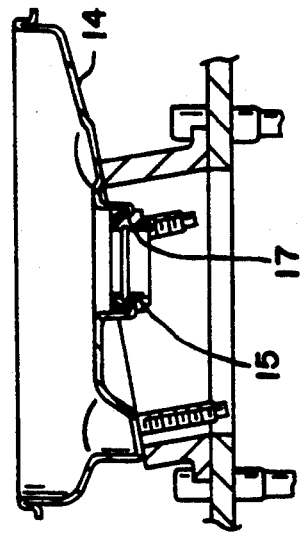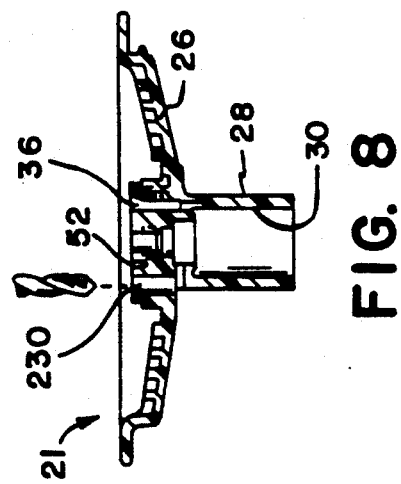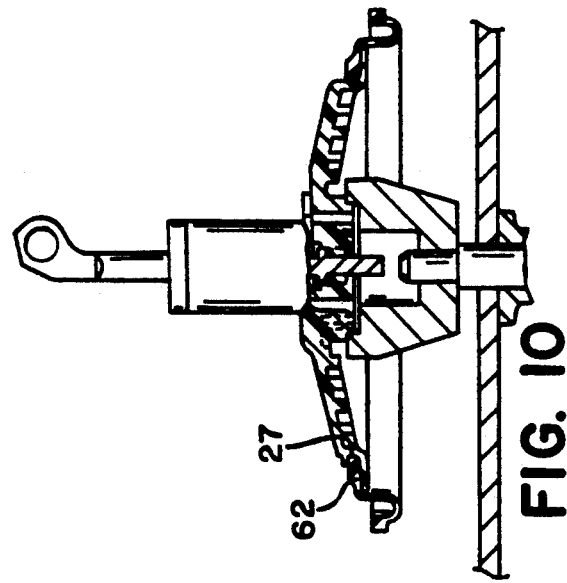

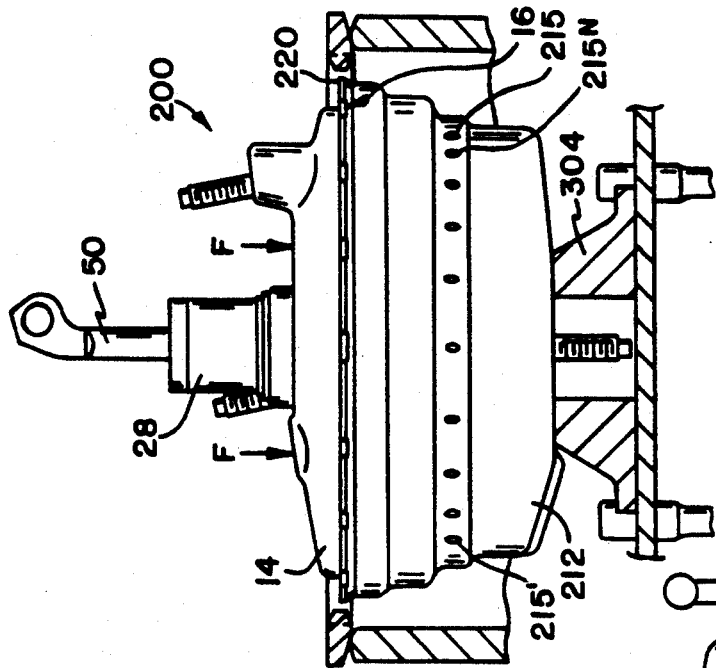
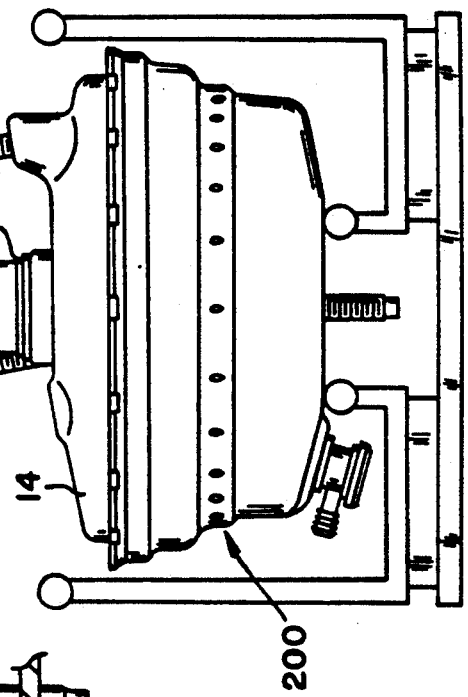
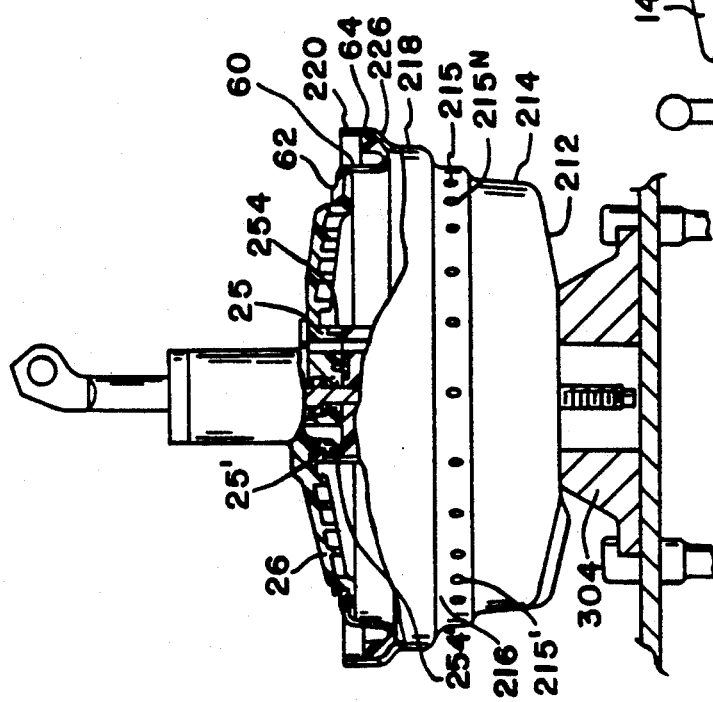
FIG. 13
FIG. 14
FIG. 12

TANDEM BRAKE BOOSTER

This invention relates to the manufacture of a tandem brake booster utilizing a commonized rear shell, control valve and a rear wall made by modifying a separation wall of a single brake booster.

Single vacuum brake boosters such as disclosed in U.S. Pat. No. 4,970,939 have a movable wall with a central hub for retaining a control valve. The control valve controls the creation of a pressure differential to develop an output force corresponding to an input force applied by an operator. This type vacuum brake booster is adequate for most applications, however, under some circumstances a greater output force is necessary to effect a brake application within set specifications or standards.

In order to increase the output of a single vacuum brake booster, a method is disclosed in U.S. Pat. Nos. 3,146,682; 3,289,547; 3,517,588 and 5,076,142 for dividing the interior of a housing into front and rear chambers by a partition to create a tandem brake booster which has an output force of approximate double that of a single vacuum brake booster. In such tandem vacuum brake boosters, a first wall on one side of the partition is secured to a second wall on the other side of the partition. Various passageways through the walls connect the front and rear chambers such that the front and the rear chambers are connected together at all times while a control valve carried by the second wall selectively controls the communication of fluid to the second chamber to create the operational pressure differential. The operational pressure differential acts on the first and second walls to produce an output force which is approximately double that of a single vacuum booster. In all such tandem brake boosters, the first wall is connected to the second wall through a positive attachment such as bolts, a threaded connection or a series of hooks to assure that the first and second walls simultaneously move within the housing. In addition, while the control valve for a tandem brake booster may be identical to that used in a single brake booster, the second wall in which the control valve is retained can only be used in a tandem brake booster because the unique connection required to join the first and second walls.

Commonality of components for use in manufacturing a tandem brake booster is illustrated in U.S. Pat. No. 3,813,992 wherein a pair of identical single brake boosters are joined together to develop an output force which is approximately double that of a single brake booster. In this arrangement, each component of the single is repeated to define a tandem brake booster. While this arrangement does provide for assurance that a power source is available to effect a brake application should one of the boosters become inoperative, the added weight and physical size would be unacceptable for most vehicle applications.

In the present invention, a separation wall used in a single vacuum brake booster is modified for use as the rear wall in a tandem brake booster. The modification of the separation wall occurs by forming a passageway therein which allows free and unrestricted communication between the rear chambers. Further a different plunger is required for the control valve to connect the reaction disc with the input valve rod. The plunger is supported by bearing walls located in the central hub of the rear wall and cylindrical body in the front wall to maintain the axial alignment between the input push rod in the rear wall and the output push rod retained in the front wall. A series of splines on the peripheral surface of a central hub of the rear wall are located in keyways in a cylindrical body of the front wall to maintain alignment with the various passageways between the front and rear chambers. A return spring located in the front chamber acts on the front wall to resiliently connect the front wall with the rear wall while at the same time compressing a seal located between the front and rear walls to assure that cross fluid communication does not occur between the passageways which would effect the development of an operational pressure differential between the front and rear chamber during a brake application.

It is an object of this invention to provide a method of manufacturing a tandem brake booster using a modified separation wall and control valve of a single brake booster.

It is another object of this invention to provide a tandem brake booster with a front wall which is connected to a rear wall through a plurality of splines which are located in keyways to align passageways between front and rear chambers, the connection being maintained by a force of a return spring acting on a seal to assure there is no cross communication does not occur between the passageways.

It is still a further object of this invention to provide a method of assembling a tandem brake booster to assure that passageways between the front and rear chambers are aligned and sealed to prevent the communication of fluid from the rear chamber into the front chamber during a brake application.

These objects and other advantages associated from the manufacture of the tandem brake booster should be apparent from reading this specification while viewing the drawing wherein:

FIG. 3 illustrates an assembly step in a method of manufacturing the tandem brake booster of FIG. 2 wherein a front wall is joined to a partition member;

FIG. 4 illustrates a front shell for the tandem brake booster of FIG. 2;

FIG. 5 illustrates another step in the method of manufacturing the tandem brake booster whereby the partition member and first wall are retained in the front shell of FIG. 4;

FIG. 6 illustrates a separation plate for the single brake booster shown in FIG. 1;

FIG. 7 illustrates a partial prospective view of the hub section of the separation plate illustrated in FIG. 6;

FIG. 8 illustrates another step in the method of manufacturing the tandem brake booster of FIG. 2 wherein a passageway is placed in the separation plate illustrated in FIG. 6;

FIG. 9 illustrates another step in the method of manufacturing the tandem brake booster of FIG. 2 wherein a control valve and diaphragm are joined to the separation plated illustrated in FIG. 6;

FIG. 10 illustrates another step in the method of manufacturing the tandem brake booster of FIG. 2 wherein a diaphragm is attached to the separation plate of FIG. 9 to complete the subassembly of the rear wall of FIG. 9;

FIG. 11 illustrates a typical rear shell for both a single and now a tandem brake booster which has been obtained from a source of supply and placed on a fixture;

FIG. 12 illustrates another step in the method of manufacturing the tandem brake booster of FIG. 2 wherein the rear wall joined with the front wall located in the front shell illustrated in FIG. 5;

Figure 2:
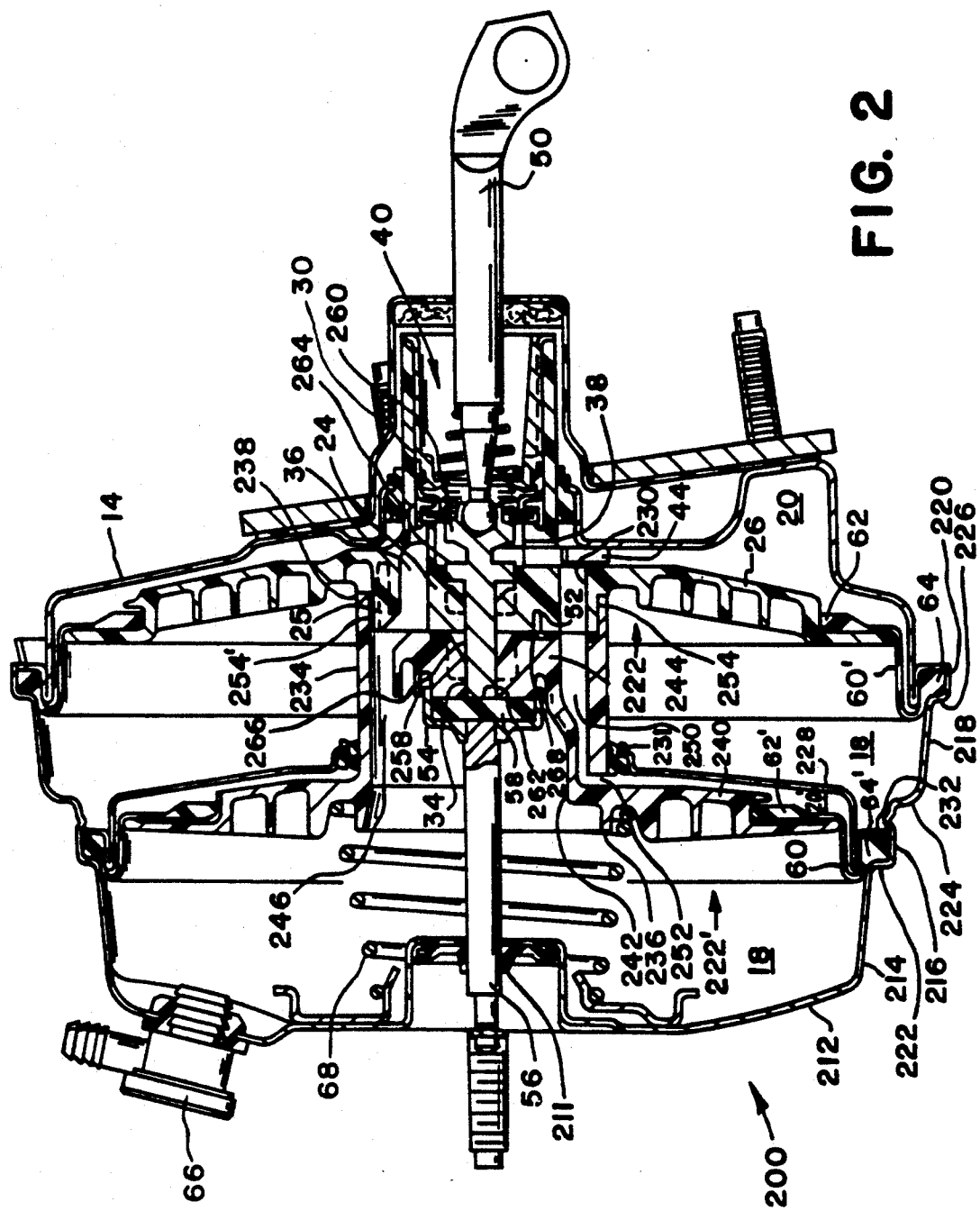
FIG. 2 is a sectional view of a tandem brake booster made according to a method of manufacture taught by the principles of the present invention using some modified structural components from the a typical single brake booster illustrated in FIG. 1, the hub section being taken along line 2—2 of FIG. 7.

FIG. 13 illustrates another step in the method of manufacturing the tandem brake booster of FIG. 2 wherein the front and rear shell are bought together and shell wherein the front and rear shell are brought together and a flange on the front shell is lanced to join the front shell with the rear shell and form a unitary; and FIG. 14 illustrates another step in the method of manufacturing the tandem brake booster of FIG. 2 wherein a boot is placed on the rear shell to protect that portion of the rear wall which extends through the shell from contamination by components in the environment.

Figure 1:
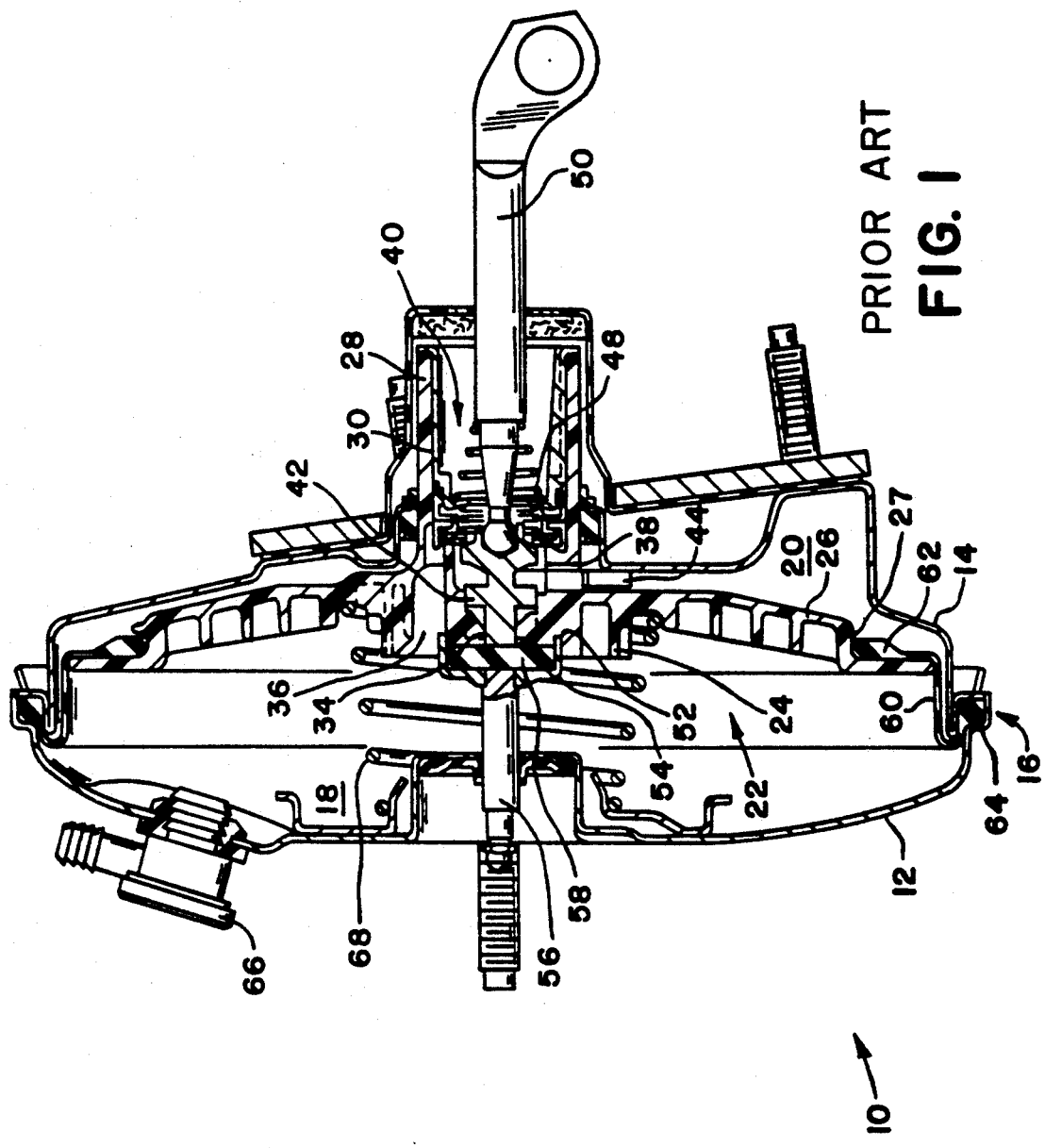
FIG. 1 is sectional view of a typical single brake booster.

FIG. 1 illustrates a typical single brake booster 10 having a front shell 12 joined to a rear shell 14 by a twist lock arrangement 16 to form a unitary structure. A wall 22 which includes a radial disc 26 and diaphragm 60 divide the interior of the unitary structure into a front chamber 18 and a rear chamber 20. The radial disc 26 has an integral central hub 24 and a cylindrical projection 28 that extends through the rear shell 14. The diaphragm 60 has a first bead 62 located in a groove 27 on the radial disc 26 and a second bead 64 that is confined by the twist lock arrangement 16 to assure that the front 18 and rear 20 chambers are separated from each other and the environment. The central hub 24 and cylindrical projection 28 have an axial bore 30 which extend therethrough. The front of the central hub 24 as best shown in FIG. 7 has a plurality of splines 25, 25' and axial slots 28, 28' that extend from the radial disc 26 to a front face 32 and a bearing surface 34 adjacent the front face 32 that extends inward into the axial bore 30. The central hub 24 has a first passageway 36, 36' that extends from the front face 32 to the axial bore 30 and a second passageway 38 that extends from the axial bore 30 through the cylindrical body 28. The front face 32 has an annular groove 52 which receives head 54 that surrounds reaction disc 58. Head 54 communicates an output force developed through movement of the wall 22 by a pressure differential between chambers 18 and 20 to output rod 56 connected to pistons in a master cylinder. The development of the output force is controlled by a control valve 40 located in bore 30 that responds to an input force applied to push rod 50. The control valve 40 has a plunger 42 which is retained in bore 30 by a key member 44 of the type disclosed in U.S. Pat. No. 4,953,446 and a poppet member 48.

The brake booster 10 is located in a vehicle with chamber 18 connected to the intake manifold of an internal combustion engine through check valve 66. When the engine is in operation, vacuum is produced at the intake manifold which evacuates air from chambers 18 and 20 to allow return spring 68 to position wall 22 as shown in FIG. 1. When an operator desires to effect a brake application, an input force is applied to a brake pedal which linearly moves push rod 50 causing plunger 42 to move away from an atmospheric seat on poppet member 48 and allow air to flow from the environment through bore 30 and passageway 38 into chamber 20. With air in chamber 20 and vacuum in chamber 18, a pressure differential corresponding to the input force is created which develops an output force that acts on wall 22. After overcoming the force of return spring 68, the output force moves wall 22 toward chamber 18. The output force is communicated from wall 22 to head 54 through reaction disc 58 to provide the output rod 56 with the desired force to effect brake application.

When the size and weight of a vehicle increases, the size of the components in a brake system need to be correspondingly modified. When the space is available, the diameter of a brake booster 10 can be increased to meet an increase in the boost force required to provide similar braking capabilities. When the weight of a vehicle reaches a certain weight an increase in the effective diameter of the movable wall 22 for the brake booster 10 may not be sufficient to develop a force capable of meeting desired braking standards. Through experience, it has been found that a smaller diameter tandem brake booster may be selected to replace a larger diameter single brake booster 10 to retain desired braking characteristics or capabilities while meeting brake standards imposed by a customer or a governmental regulation. However, the cost of additional and different components for such a tandem brake booster may be such that a customer may now prefer a hydraulic brake booster for the vehicle. In an effort to reduce the cost of a tandem brake booster the present invention disclosed how the components of a single brake booster may be adapted or modified during manufacturing to produce a tandem brake booster 200 as illustrated in FIG. 2 such that additional cost would not be a significant factor in the selection of a brake booster for a vehicle.

In FIG. 2 components in the tandem brake booster 200 which are identical with the components of the single brake booster 10 of FIG. 1 are identified with the same number. The tandem brake booster 200 has a front shell 212 attached to the rear shell 14 by the same twist lock arrangement 16 to form a unitary structure. The front shell 212 has a housing with an end having a substantially cylindrical body extending therefrom. The housing has first 214, second 216, third 218 and fourth 220 diameters separated by first 223, second 224 and third 226 radial shoulders. Output rod 56 which extends through an opening 211 in the end of the front shell 212 is connected to the pistons in the master cylinder and the input from the operator for operating the brake booster is supplied to control valve 40 by push rod 50. The interior of the unitary structure is divided into front chambers 18, 18' and rear chambers 20, 20' by walls 222, 222' and a partition member 228. Wall 222' has a cylindrical body 234 with an integral radial disc 240 extending from a first end 236 and a second end 238 which extends through a central opening 230 in partition member 228. A diaphragm 60' has a first bead 62' located in the radial disc 240 and a second bead 64' located between annular flange 232 on the peripheral surface of partition member 228 and radial shoulder 223 on the front shell 212. The cylindrical body 234 has an axial bore 242 therein which extends to a bearing member 244 adjacent end 238. A first passageway 246 connects the first end 236 with the second end 238 while second passageway 250 connects an intermediate opening 252 that extends through the cylindrical body 234 adjacent the radial disc 240 with the second end 238. A plurality of internal keyways 254, 254' which extend from bearing member 244 to the second end 238 are matched with splines 25, 25' on hub member 24 of wall 222 to maintain alignment of passageway 246 with passageway 36 and passageway 250 with passageway 230.

Head 54 of output rod 56 which is located in an annular groove 258 in bearing member 244 holds reaction disc 58 in contact with bearing member 244. Plunger 260 which is attached to push rod 50 has a face 262 through which a reaction force is communicated to balance an input force applied to push rod 50 during the development of an output force to effect a brake application. Plunger 260 has a first diameter 264 that engages axial bore 30 and a second diameter 266 that engages bearing member 34 in hub 24 and bearing member 244 to retain face 262 in axial alignment with a reaction disc 58.

Brake booster 200 is installed in a vehicle having an internal combustion engine and connected to the intake manifold through check valve 66. When the vehicle is operating, vacuum continually evacuates air from the front chambers 18, 18' by way of bore 242, passageway 246 and slots 28, 28' and from the rear chambers 20, 20' by way of opening 252, passageway 250, passageway 230, passageway 38, bore 30 and passageway 36 to allow return spring 68 to position walls 222, 222' as shown in FIG. 2. When an operator desires to effect a brake application, an input force is applied to a brake pedal which linearly moves push rod 50 causing plunger 260 to move away from an atmospheric seat on poppet 48 and allow air to flow from the environment through bore 30 and passageway 38 into chambers 20, 20'. With air in chambers 20, 20' and vacuum in chambers 18, 18' a pressure differential corresponding to the input force is created which develops an output force that acts on walls 222, 222'. After overcoming the force of return spring 68, the output force moves walls 222, 222' toward chamber 18, 18'. The output force is communicated through bearing member 244 of front wall 222' to head 54 through reaction disc 58 to provide the output rod 56 with the desired force to effect brake application. The plurality of splines 25, 25' and keyways 254, 254' maintains passageway 246 in alignment with axial slots 28, 28' and passageway 36 and passageway 250 in alignment with passageway 230 to provide uninterrupted communication between the front 18, 18' and rear 20, 20' chambers while seal 268 located in groove 52 assures that cross communication does not occur during a brake application.

While brake booster 200 functions in a manner similar to that of brake booster 10, the method of assembly differs even though common structural components are used in the manufacture thereof. The method of assembly of brake booster 200 which defines part of the invention disclosed herein begins with the subassembly of wall 222' shown in FIG. 3 being located at a station in an assembly line. The partition member 228 is first placed in a fixture 300. After bead 62' of diaphragm 60' is placed on radial disc 240, cylindrical body 234 is inserted through opening 231 in partition member 228 and bead 64' located on flange 232. Head 54 of output rod 56 is located in groove 258 such that reaction disc 58 engages the face of bearing member 244. Return spring 68 is located in groove 241 on the face 236 of radial disc 240 and a front shell 212 as shown in FIG. 4 is obtained from a source of supply. Front shell 212 is placed on wall 222' as shown in FIG. 5 and a force F is applied to front shell 212 to compress the return spring 68 and bring radial shoulder 223 into engagement with bead 64'. Thereafter, a radial force is applied through a series of knives or lance members 302 that engage and deform radial diameter 216 such that a plurality of detents 215, 215 . . . 215$_n$ are formed on diameter 216 of housing of the front shell which hold the peripheral surface on flange member 232 of partition member 228 in a fixed position and seal chamber 18' from chamber 20'.

At another station in the assembly line, wall 222 shown in FIG. 9 is built up as a subassembly by the following steps: A plate member 21 as shown in FIG. 6 having a hub 24 and integral radial disc 26 is obtained from a source of supply. Plate member 21 is identical to that used in wall 22 of the single brake booster 10, however, before the wall 222 can be assembled, plate member 21 is transported to a station as shown in FIG. 8 where bore 230 is drilled to remove plug 31. After plug 31 is removed, plate member 21 is placed on a fixture 305 as shown in FIG. 9 where control valve 40 is inserted into bore 30. The plunger 260 of control valve 40 having already been attached to push rod 50 in a previous subassembly. Control valve 40 is retained in bore 30 by inserting key member 44 in opening while retainer 41 is secured to cylindrical body 28 to assure that spring return spring 51 may properly position atmospheric face on plunger 260 against poppet member 48 to seal bore 30 from the environment. Thereafter, as shown in FIG. 10 bead 62 on diaphragm 60 is located in a annular groove 25 on radial plate 26 to complete this portion of the assembly.

Shell 212 with wall 222 attached thereto is rotated 180° and placed in a fixture 304 as shown in FIG. 12. The sub assembly of wall 222 shown in FIG. 10 is brought into alignment with shell 212 such that the plurality of splines 25, 25' are mated with keyways 254, 254' to assure that the internal passageways which connect chambers 18, 18' and 20, 20' are matched with each other. A rear shell 14 as shown in FIG. 11 is obtained from a source of supply and an seal 15 is place in opening 17. The rear shell 14 is placed on shell 212 as shown in FIG. 13 such that radial shoulder 226 engages bead 64. A force F 11 is applied to shells 14 and 212 to compress bead 64 and a radial force applied to knives for lancing diameter 220 to form lock joint arrangement 16 to seal the interior of brake booster 200 for the surrounding environment. After the lancing operation, the brake booster 200 is transported to a station illustrated in FIG. 14, where a protective boot 29 is placed on the rear shell 14 to protect cylindrical body 28 which extends through opening 17 from direct exposure to the environment Through the above disclosed modifications in the components of the single brake booster of FIG. 1, a tandem brake booster 200 has been developed which is cost effective.

I claim:

1. A method of manufacturing a tandem brake booster comprising the steps of:

placing a partition member in a fixture, said partition member having a central opening and an annular flange on its peripheral surface;

obtaining a first wall from a supply source, said first wall having a cylindrical body with a first end and a second end, said cylindrical body having an integral radial disc extending from said first end, said first wall having a diaphragm member with an expandable section connected to said radial disc and a first bead, said cylindrical body having a first axial bore therethrough, a first passageway that connects said first end to said second end, and a second passageway that connects an intermediate point on the peripheral surface of said cylindrical body adjacent said radial disc with said second end, said cylindrical body having a plurality of internal keyways adjacent said second end, said cylindrical body having a first bearing member that extends inward into said first axial bore;

locating said first wall over said partition member with said sleeve member extending through said central opening and said first bead located on said flange;

inserting an output push rod and reaction disc in said first axial bore, placing a return spring on said first wall;

obtaining a first shell from a source of supply, said first shell having an end with a substantially cylindrical housing extending therefrom, said end having an opening therethrough, said cylindrical housing having first, second, third, and fourth diameters separated by first, second and third radial shoulders;

moving said first shell toward said fixture to compress said return spring until said first bead engages said first radial shoulder and a portion of said output push rod extends through said opening in said end of said first shell;

crimping said second diameter of said cylindrical housing of said first shell when said partition and first shell are positioned a fixed distance from each other to establish and maintain a seal between said peripheral surface on said partition member, first bead of said first diaphragm and second diameter and first radial shoulder of said first shell;

obtaining a second wall from a supply source, said second wall having a central hub with an integral radial disc and a cylindrical projection extending therefrom, said central hub and cylindrical projection having a second axial bore extending therethrough, said central hub having a plurality of splines and axial slots that extend from said radial disc to a front face and a second bearing surface adjacent said front face that extends inward into said second axial bore, said central hub having a first passageway that extends from said front face to said second axial bore and a second passageway that extends from said second axial bore through said cylindrical body;

forming a third passageway through said central hub for connecting said front face with a rear face on said radial disc of said second wall;

placing a valve assembly in said second axial bore, said valve assembly having a plunger with a first surface that engages said second axial bore and a second surface which engages said second bearing surface and extends past said front face of said central hub;

inserting a key in said second passageway of said second wall to retain said valve assembly in said second axial bore;

attaching a second diaphragm to said radial disc of said second wall, said second diaphragm having an expandable section with a second bead thereon;

obtaining a second shell from a source of supply, said second shell having a substantially disc-like member with a central opening and an annular flange of its peripheral surface;

placing said second wall in said second shell with said axial cylindrical projection extending through said central opening and said second bead on said second diaphragm being located in said annular flange;

moving said second shell toward said first said shell after aligning said plunger with said first bearing surface and said splines on said central hub with the keyways in the cylindrical body of said first wall;

applying a force to second shell to initially bring said front face of said central hub into engagement with said second end of said cylindrical body of said first wall to align said first passageway in said first wall with said first passageway and axial slots in said central hub and said second passageway in said first wall with said third passageway in said central hub and thereafter overcoming the force of said return spring to bring said second bead into engagement with said third radial shoulder on said cylindrical body of said first shell, said spring force being communicated through said first movable wall to establish a sealed joint between said second end of said cylindrical body and central hub; and bringing a portion of said fourth diameter of said cylindrical housing of said first shell into engagement with said flange on the disc of said second shell to form a seal between said second bead, flange on said second shell, fourth diameter and third radial flange to form a unitary structure from said first and second shells.

2. In the tandem brake booster as recited in claim 1 wherein said supply source of second walls can be also be used for a single brake booster by plugging said third passageway therein.

3. In a tandem brake booster having a first wall and a second wall which simultaneously move in response to an operational force developed by a pressure differential created between a first fluid in a plurality of first chambers and a second fluid in a plurality of second chambers said operational force overcome a force of a return spring to produce an output force as a function of an input force applied to a control valve, the improvement in the connection of said first wall with said second wall comprising:

a cylindrical body connected to said first wall, said cylindrical body having a first end and a second end, said cylindrical body having a first axial bore therethrough, a first passageway that connects one of said plurality of first chambers to said second end and a second passageway that connects one of said plurality of second chambers with said second end, said first cylindrical body having a plurality of internal keyways adjacent said second end;

a central hub connected to said second wall, said central hub having a cylindrical projection extending therefrom with a second axial bore therein for retaining said control valve, said central hub having a plurality of splines and axial slots rearwardly extending from a front face, said splines being aligned with said keyways while said axial slots connect said first passageway with another of said plurality of first chambers to provide for free communication between said plurality of first chambers, said central hub having a third passageway that extends from said front face to connect said first passageway and first chambers with said second axial bore, a fourth passageway that extends from said front face to connect said second passageway with another of said plurality of second chambers and a fifth passageway that connects said second axial bore with said second chambers, said control valve moving within said second axial bore to selective allow communication of said second fluid to said second chambers by way of said fifth passageway to create said pressure differential; and seal means located between said front face on said central hub and said second end on said cylindrical body, said return spring acting on said first wall to compress said seal means between said second end and front face to prevent cross communication of said second fluid between said first and second chambers when said second fluid is presented to said second chambers.

4. In the tandem brake booster as recited in claim 3 wherein said cylindrical body further includes:

a first bearing surface that projects into said first axial bore, said bearing surface having a face with a groove therein for retaining said seal means in alignment with said front face on said central hub.

5. In the tandem brake booster as recited in claim 4 wherein said central hub further includes:

a second bearing surface that projects into said second axial bore.

6. In the tandem brake booster as recited in claim 5 wherein control valve further includes:

a plunger having a face through which a reaction force is communicated to balance said input force during the development of said output force, said plunger having a first diameter that engages said second axial bore and a second diameter that engages said first and second bearing surfaces to retain said face in axial alignment with a reaction disc.

7. In the tandem brake booster as recited in claim 6 wherein said plurality of splines and keyways maintain said first passageway in alignment with said axial slots and third passageway and said second passageway in alignment with said fourth passageway to provide uninterrupted and free communication between said first and second plurality of chambers, respectively.

* * * * *